United States Patent
Matsumoto et al.

(10) Patent No.: US 10,738,686 B2
(45) Date of Patent: Aug. 11, 2020

(54) INTERNAL COMBUSTION ENGINE CONTROLLER

(71) Applicant: TOYOTA JIDOSHA KABUSHIKI KAISHA, Toyota, Aichi-ken (JP)

(72) Inventors: Yosuke Matsumoto, Susono (JP); Satoshi Yoshizaki, Toyota (JP)

(73) Assignee: TOYOTA JIDOSHA KABUSHIKI KAISHA, Tokyo (JP)

( * ) Notice: Subject to any disclaimer, the term of this patent is extended or adjusted under 35 U.S.C. 154(b) by 25 days.

(21) Appl. No.: 16/165,215

(22) Filed: Oct. 19, 2018

(65) Prior Publication Data

US 2019/0153931 A1 May 23, 2019

(30) Foreign Application Priority Data

Nov. 20, 2017 (JP) ................................. 2017-222847

(51) Int. Cl.
*F02B 37/16* (2006.01)
*F02D 41/00* (2006.01)
*F02D 41/04* (2006.01)

(52) U.S. Cl.
CPC .......... *F02B 37/16* (2013.01); *F02D 41/0007* (2013.01); *F02D 41/045* (2013.01); *F02D 2200/021* (2013.01); *F02D 2200/0406* (2013.01); *F02D 2200/101* (2013.01); *F02D 2200/602* (2013.01)

(58) Field of Classification Search
CPC .... F02B 37/16; F02D 41/0007; F02D 41/045; F02D 2200/021; F02D 2200/0406; F02D 2200/101; F02D 2200/602

USPC ................ 60/611–612, 605.1; 701/103–104; 123/562
See application file for complete search history.

(56) References Cited

U.S. PATENT DOCUMENTS

| 4,530,339 A | * | 7/1985 | Oguma | .................... F02B 39/16 123/561 |
| 2011/0041493 A1 | * | 2/2011 | Doering | .............. F02D 41/0007 60/603 |

(Continued)

FOREIGN PATENT DOCUMENTS

| JP | H05-163954 A | 6/1993 |
| JP | 2007-056842 A | 3/2007 |

(Continued)

*Primary Examiner* — Thai Ba Trieu
(74) *Attorney, Agent, or Firm* — Oliff PLC (57) ABSTRACT

An internal combustion engine controller is applied to an internal combustion engine incorporating a turbocharger. The engine includes an intake passage, a compressor arranged in the intake passage, a bypass passage connecting portions of the intake passage at upstream and downstream sides of the compressor. An air bypass valve adjusts a flowrate of intake air passing through the bypass passage. The internal combustion engine controller includes an acceleration determination unit and an ABV control unit. The acceleration determination unit is configured to detect an acceleration request sent to the internal combustion engine and determine whether or not the acceleration request is in an initial stage. The ABV control unit is configured to execute a temporary open/close control to open the air bypass valve for a specified period when determined by the acceleration determination unit that the acceleration request is in the initial stage.

6 Claims, 5 Drawing Sheets

(56) References Cited

U.S. PATENT DOCUMENTS

| | | | |
|---|---|---|---|
| 2014/0202435 A1* | 7/2014 | Hilditch | F02B 37/16 |
| | | | 123/568.21 |
| 2014/0290630 A1* | 10/2014 | Pursifull | F02B 37/16 |
| | | | 123/564 |
| 2016/0363043 A1* | 12/2016 | Hirayama | F02D 41/0007 |
| 2017/0030259 A1* | 2/2017 | Tabata | F02D 41/0007 |
| 2017/0356350 A1* | 12/2017 | Li | F02D 41/1406 |

FOREIGN PATENT DOCUMENTS

| | | |
|---|---|---|
| JP | 2008-286149 A | 11/2008 |
| JP | 2010-096049 A | 4/2010 |
| WO | WO-2013164987 A1 * | 11/2013 |

\* cited by examiner

INTERNAL COMBUSTION ENGINE CONTROLLER

BACKGROUND ART

The present invention relates to an internal combustion engine controller applied to an internal combustion engine incorporating a turbocharger.

Japanese Laid-Open Patent Publication No. 2010-096049 discloses a controller for an internal combustion engine that reduces the response delay of a turbocharger by closing a waste gate valve when an acceleration request is detected. In this manner, it is known that in an internal combustion engine incorporating a turbocharger of an exhaust turbine type, the response of the turbocharger is delayed when acceleration starts. This delays the response of the acceleration.

When acceleration starts from a deceleration state, the rotation speed of a turbine wheel is low. Thus, the resistance is large when intake air passes through a compressor. That is, the pressure loss is large when the intake air passes through the compressor, and the flow of intake air drawn toward the downstream side of the compressor is inhibited. This may lower the supercharging pressure, which is the pressure of the intake air between the downstream side of the compressor and the upstream side of a throttle valve, when the air at the downstream side of the compressor is suctioned into the combustion chamber. The reduction in the supercharging pressure is one of the factors causing the response delay of acceleration.

In an internal combustion engine incorporating a turbocharger, it is desirable that the response delay of acceleration be reduced.

SUMMARY OF THE INVENTION

One aspect of the present invention is an internal combustion engine controller applied to an internal combustion engine incorporating a turbocharger. The internal combustion engine includes an intake passage, a compressor arranged in the intake passage, a bypass passage connecting a portion of the intake passage at an upstream side of the compressor and a portion of the intake passage at a downstream side of the compressor, and an air bypass valve that adjusts a flowrate of intake air passing through the bypass passage. The internal combustion engine controller includes an acceleration determination unit and an ABV control unit. The acceleration determination unit is configured to detect an acceleration request sent to the internal combustion engine and determine whether or not the acceleration request is in an initial stage. The ABV control unit is configured to execute a temporary open/close control to open the air bypass valve for a specified period when determined by the acceleration determination unit that the acceleration request is in the initial stage.

In the configuration described above, the air bypass valve is opened for a specified period in the initial stage of the acceleration request, and thus a portion of the intake air temporarily bypasses the compressor and flows through the bypass passage. The influence by the pressure loss in the compressor can be reduced by the intake air bypassing the compressor and flowing toward the downstream side of the compressor in the initial stage of the acceleration request. Therefore, the lowering of the supercharging pressure can be suppressed by opening the air bypass valve by the temporary open/close control in the initial stage of the acceleration request at when the supercharging pressure sometimes lowers. The response delay of the acceleration can thus be reduced.

In one example of the internal combustion engine controller, the acceleration determination unit is configured to determine that the acceleration request is in the initial stage when a request torque of the internal combustion engine becomes greater than or equal to an acceleration determination value from a state in which the request torque is smaller than the acceleration determination value.

When the air bypass valve is open, a portion of the intake air is passed through the bypass passage, and hence the increase in the supercharging pressure involved in the increase in the rotation of the turbine wheel easily becomes gradual. Thus, the opening of the air bypass valve by the temporary open/close control is desirably a short period.

According to the configuration described above, the initial stage of the acceleration request can be captured, and the air bypass valve can be temporarily opened only in the initial stage of the acceleration request at when the lowering of the supercharging pressure occurs.

In one example of the internal combustion engine controller, the ABV control unit is configured to open the air bypass valve when a valve opening condition has been satisfied with the acceleration request in the initial stage during the temporary open/close control. Further, the ABV control unit is configured to determine that the valve opening condition has been satisfied when an intake pressure, which is an inner pressure of an intake manifold, is lower than a low pressure determination value.

When the intake pressure is at a low level, the supercharging pressure tends to easily lower when the throttle valve is controlled toward the open side. According to such configuration, the air bypass valve can be temporarily opened when the supercharging pressure tends to easily lower.

In one example of the internal combustion engine controller, the ABV control unit is configured to determine that the valve opening condition has been satisfied when an engine rotation speed is greater than or equal to a lower limit rotation speed.

When the engine rotation speed is at a low level, the period in which the supercharging pressure lowers in the initial stage of acceleration request is short and the lowering amount of the supercharging pressure is also small. That is, the effect that can be obtained is small even if the air bypass valve is temporarily opened. In the configuration described above, the air bypass valve can be temporarily opened when the effect obtained by temporarily opening the air bypass valve is large by determining that the valve opening condition has been satisfied when the engine rotation speed is greater than or equal to the lower limit rotation speed.

In one example of the internal combustion engine controller, the ABV control unit is configured to determine that the valve opening condition has been satisfied when a coolant temperature of the internal combustion engine is lower than an upper limit coolant temperature.

When the coolant temperature is at a high level, the response speed of when opening/closing the air bypass valve is lowered and the switch between valve opening and valve closing may not be executed in a short time. In the configuration described above, the air bypass valve can be suppressed from being temporarily opened when the response speed of the air bypass valve is lowering by determining that the valve opening condition has been satisfied when the coolant temperature is lower than the upper limit coolant temperature.

In one example of the internal combustion engine controller. When starting to open the air bypass valve during the temporary open/close control, the ABV control unit is configured to set an ABV open request time is shorter if an engine rotation speed is higher at a time point when the opening of the air bypass valve starts. Further, the ABV control unit is configured to close the air bypass valve if an elapsed time from when the air bypass valve is opened reaches the ABV open request time during the execution of the temporary open/close control.

The period in which the supercharging pressure lowers in the initial stage of the acceleration request can be predicted based on the engine rotation speed. According to the configuration described above, the time of opening the air bypass valve is changed according to the time predicted that the supercharging pressure will lower. Thus, the time for opening the air bypass valve can be suppressed from becoming excessively long, and the supercharging pressure can be rapidly increased.

In one example of the internal combustion engine controller, the ABV control unit is configured to determine that a valve closing condition has been satisfied in a case in which an intake pressure, which is an inner pressure of an intake manifold, is higher than a high pressure determination value. The ABV control unit closes the air bypass valve if the valve closing condition has been satisfied during the temporary open/close control even when the elapsed time from when the air bypass valve is opened is within the ABV open request time.

When the intake pressure is at a high level, determination can be made that the lowering of the supercharging pressure that occurs in the initial stage of the acceleration request is resolved. According to the configuration described above, when the intake pressure is higher than the high-pressure determination value, the temporary open/close control is terminated and the supercharging pressure can be rapidly increased.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 7(a) to 7(h) show a timing chart of when the temporary open/close control is executed by the ABV control unit of FIG. 1.

DETAILED DESCRIPTION OF PREFERRED EMBODIMENTS

First Embodiment

Hereinafter, a controller 10, which is one embodiment of a controller for an internal combustion engine, will be described with reference to FIGS. 1 to 7.

Figure 1:
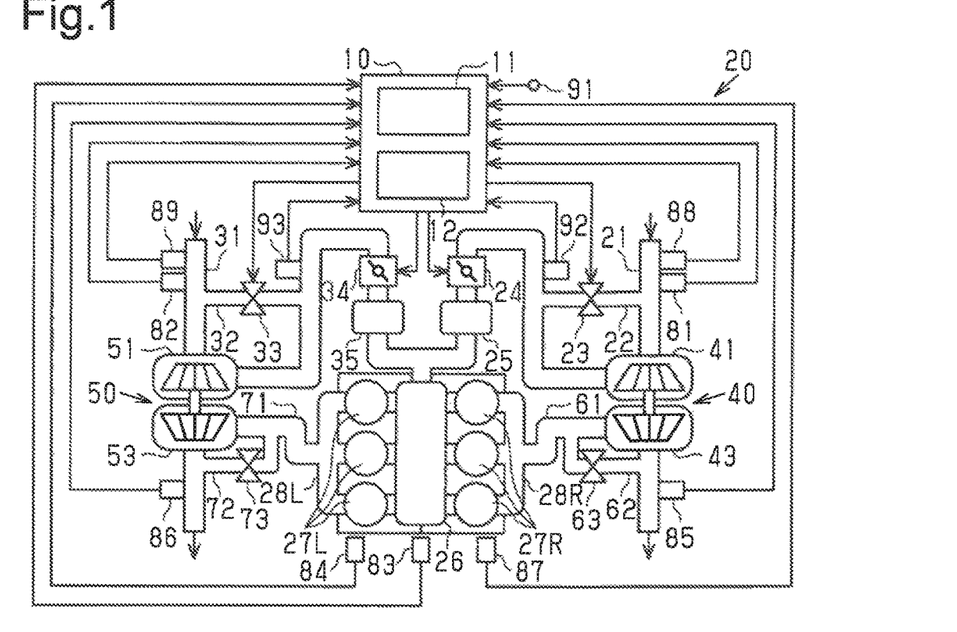
FIG. 1 is a schematic view showing a first embodiment of a controller of an internal combustion engine and an internal combustion engine serving as a control target.

FIG. 1 schematically shows the controller 10 and an internal combustion engine 20 to which the controller 10 is applied.

The internal combustion engine 20 includes two exhaust turbine type turbochargers. A first turbocharger 40 and a second turbocharger 50 are arranged in parallel.

The first compressor 41 of the first turbocharger 40 is arranged on a first intake passage 21. A first air flowmeter 81 that detects an intake air amount passing the first intake passage 21 and a first intake air temperature sensor 88 that detects an intake air temperature at an upstream side of the first compressor 41 are arranged at an upstream side of the first compressor 41 in the first intake passage 21. A first bypass passage 22 communicating the upstream side and the downstream side of the first compressor 41 and bypassing the first compressor 41 is arranged on the first intake passage 21. A first air bypass valve 23 that adjusts a flowrate of the air passing the first bypass passage 22 is arranged on the first bypass passage 22. When the first air bypass valve 23 is opened, a portion of the intake air flows into the first bypass passage 22 according to the opening.

A first throttle valve 24 is arranged at the downstream side of a downstream side connecting portion of the first bypass passage 22 in the first intake passage 21. A first supercharging pressure sensor 92 that detects a pressure of an intake air at the downstream side of the first compressor 41 is arranged between the first compressor 41 and the first throttle valve 24. The pressure detected by the first supercharging pressure sensor 92 is increased by the drive of the first turbocharger 40. Such pressure is referred to as "supercharging pressure at the downstream side of the first compressor 41." A coolant-cooling type first inter-cooler 25 is arranged at the downstream side of the first throttle valve 24 in the first intake passage 21.

The first intake passage 21 is connected to an intake manifold 26. The intake manifold 26 is connected to a cylinder block of the internal combustion engine 20. The intake air that passed through the first inter-cooler 25 is introduced to each cylinder of the internal combustion engine 20 through the intake manifold 26. An intake pressure sensor 83 that detects the inner pressure of the intake manifold 26 is arranged in the intake manifold 26.

The internal combustion engine 20 includes six cylinders in the cylinder block. In FIG. 1, a cylinder located on the right side of the intake manifold 26 is referred to as a first cylinder group 27R. A cylinder located on the left side of the intake manifold 26 is referred to as a second cylinder group 27L.

The internal combustion engine 20 includes a first exhaust passage 61 through which the exhaust air discharged from the first cylinder group 27R passes. The exhaust air discharged from the first cylinder group 27R is gathered through a first exhaust manifold 28R connected to the cylinder block, and then flows into the first exhaust passage 61.

A first turbine 43 of the first turbocharger 40 is arranged on the first exhaust passage 61. A first waste gate 62 communicating the upstream side and the downstream side of the first turbine 43 and bypassing the first turbine 43 is arranged on the first exhaust passage 61. The first waste gate 62 includes an electronic control type first waste gate valve 63. The first waste gate valve 63 is open/close controlled based on the supercharging pressure at the downstream side of the first compressor 41.

A first air fuel ratio sensor 85 that can detect the air fuel ratio of the exhaust air passing the first exhaust passage 61 is attached to the downstream of the first turbine 43 in the first exhaust passage 61.

A second compressor 51 of the second turbocharger 50 is arranged on the second intake passage 31. A second air flowmeter 82 that detects an intake air amount passing the second intake passage 31 and a second intake air temperature sensor 89 that detects an intake air temperature at an upstream side of the second compressor 51 are arranged at an upstream side of the second compressor 51 on the second intake passage 31. A second bypass passage 32 communicating the upstream side and the downstream side of the second compressor 51 and bypassing the second compressor 51 is arranged on the second intake passage 31. A second air bypass valve 33 that adjusts a flowrate of the air passing the second bypass passage 32 is arranged on the second bypass passage 32. When the second air bypass valve 33 is opened, a portion of the intake air flows into the second bypass passage 32 according to the opening of the second air bypass valve.

A second throttle valve 34 and a coolant-cooling type second inter-cooler 35 are arranged in order at the downstream side of a downstream side connecting portion of the second bypass passage 32 in the second intake passage 31. A second supercharging pressure sensor 93 that detects a pressure of an intake air at the downstream side of the second compressor 51 is arranged between the second compressor 51 and the second throttle valve 34. The pressure detected by the second supercharging pressure sensor 93 is increased by the drive of the second turbocharger 50. Such pressure is referred to as "supercharging pressure at the downstream side of the second compressor 51."

The second intake passage 31 is connected to the intake manifold 26. The first intake passage 21 and the second intake passage 31 of the internal combustion engine 20 are merged at a gathering portion at the upstream side of the intake manifold 26. The intake air that passed through the second inter-cooler 35 is introduced to each cylinder through the intake manifold 26.

The internal combustion engine 20 includes a second exhaust passage 71 through which the exhaust air discharged from the second cylinder group 27L passes. The exhaust air discharged from the second cylinder group 27L is gathered through a second exhaust manifold 28L connected to the cylinder block, and then flows into the second exhaust passage 71.

A second turbine 53 of the second turbocharger 50 is arranged on the second exhaust passage 71. A second waste gate 72 that bypasses the second turbine 53 is arranged on the second exhaust passage 71. The second waste gate 72 includes an electronic control type second waste gate valve 73. The second waste gate valve 73 is open/close controlled based on the supercharging pressure at the downstream side of the second compressor 51.

A second air fuel ratio sensor 86 that can detect the air fuel ratio of the exhaust air passing the second exhaust passage 71 is attached to the downstream of the second turbine 53 in the second exhaust passage 71.

Hereinafter, the first air bypass valve 23 and the second air bypass valve 33 are sometimes referred to as "ABV23" and "ABV33."

The detection signals from the various types of sensors arranged in the internal combustion engine 20 are input to the controller 10. The controller 10 calculates the intake air amount passing the first and second intake passages 21, 31 based on the detection signals from the first and second air flowmeters 81, 82. The controller 10 calculates an engine rotation speed NE based on a detection signal from a crank angle sensor 87 that detects a rotation angle of a crankshaft. The controller 10 calculates an intake air temperature THA based on the detection signals from the first and second intake air temperature sensors 88, 89. The controller 10 calculates a coolant temperature THW based on the detection signal from a coolant temperature sensor 84 that detects a temperature of the coolant circulating through a coolant jacket and the like of the internal combustion engine 20. The controller 10 calculates an intake pressure PIM based on the detection signal from the intake pressure sensor 83. The controller 10 can also determine whether or not the intake pressure sensor 83 has abnormality based on the detection signal from the intake pressure sensor 83. The controller 10 calculates the air fuel ratio of the exhaust air passing through the first exhaust passage 61 and the second exhaust passage 71 based on the detection signals from the first and second air fuel ratio sensors 85, 86, respectively. The controller 10 calculates the supercharging pressure at the downstream side of the first compressor 41 and the supercharging pressure at the downstream side of the second compressor 51 based on the detection signals from the first and second supercharging pressure sensors 92, 93, respectively.

Furthermore, the controller 10 calculates an accelerator operation amount (accelerator pedal operation amount) ACCP based on an operation amount of an accelerator pedal 91 of a vehicle mounted with the internal combustion engine 20. The controller 10 sets a target throttle opening as a target value of a throttle opening TA based on the accelerator operation amount ACCP. The first and second throttle valves 24, 34 are controlled based on the target throttle opening. The controller 10 calculates a request torque TQ of the internal combustion engine 20 from the accelerator operation amount ACCP and the engine rotation speed NE.

The controller 10 includes an acceleration determination unit 11 and an ABV control unit 12 as function units.

The acceleration determination unit 11 executes an acceleration determination of detecting an acceleration request with respect to the internal combustion engine 20 based on a value of the request torque TQ.

The ABV control unit 12 controls the opening/closing of the first air bypass valve 23 and the second air bypass valve 33. The ABV control unit 12 independently controls the first air bypass valve 23 and the second air bypass valve 33. A voltage value of a driving mechanism for opening/closing the ABVs 23, 33 is input to the ABV control unit 12.

The ABV control unit 12 executes a steady control and a temporary open/close control as control modes of the ABVs 23, 33. In the steady control, the ABVs 23, 33 are opened when the first and second throttle valves 24, 34 are controlled toward the closing side during supercharging to suppress the supercharging air passed through the first and second compressors 41, 51 in the first and second intake passages 21, 31 from back flowing toward the compressor.

In the temporary open/close control, the ABVs 23, 33 are temporarily opened for a specified period when determined by the acceleration determination unit 11 that the current state is the acceleration request being in the initial stage (i.e., when determined by the acceleration determination unit 11 that the acceleration request is in the initial stage). The details of the temporary open/close control will be described later.

Furthermore, the controller 10 includes a WGV control unit as a function unit. The WGV control unit controls each actuator of the first and second waste gate valves 63, 73 to be able to open/close the first and second waste gate valves 63, 73.

A processing routine of an open determining process in the temporary open/close control executed by the ABV control unit 12 of the controller 10 will now be described with reference to FIG. 2. The present process is repeatedly executed for every predetermined period. In the present embodiment, the temporary open/close control is executed for the first air bypass valve 23 and the second air bypass valve 33, respectively.

When the execution of the present processing routine starts, first, the ABV control unit 12 instructs the acceleration determination unit 11 to perform an acceleration determining process in step S101. The details will be described later, but in the acceleration determining process, the acceleration request with respect to the internal combustion engine 20 is detected based on the request torque TQ of the internal combustion engine 20. When the acceleration determining process is performed, an acceleration determination flag and an acceleration initial determination flag are set to ON or OFF. The acceleration determination flag is set to ON when acceleration is requested on the internal combustion engine 20, and set to OFF when the acceleration is not requested. The acceleration initial determination flag is set to ON only when the acceleration determination flag is switched from OFF to ON, and is set to OFF at other times. When the acceleration determining process is terminated, the process proceeds to step S102.

In step S102, the ABV control unit 12 determines whether or not the acceleration initial determination flag is set to ON. When the acceleration initial determination flag is set to OFF (S102: NO), the present processing routine is once terminated.

When the acceleration initial determination flag is set to ON (S102: YES), the process proceeds to step S103. In step S103 whether or not an intake pressure PIM is smaller than a low-pressure determination value PIML is determined. The low-pressure determination value PIML is obtained through experiments and the like as a value at which lowering in the supercharging pressure may occur when the intake pressure PIM is smaller than the low-pressure determination value PIML, and stored in advance in the controller 10. When the intake pressure PIM is greater than or equal to the low-pressure determination value PIML in step S103 (S103: NO), the present processing routine is once terminated.

When the intake pressure PIM is smaller than the low-pressure determination value PIML (S103: YES), the process proceeds to step S104. In step S104, an ABV temporary open flag is set to ON by the ABV control unit 12. Thereafter, the process proceeds to step S105.

In step S105, an ABV open request time Tmax is set by the ABV control unit 12. The ABV control unit 12 acquires the engine rotation speed NE at this time point, and sets the ABV open request time Tmax based on a map indicating a relationship of the engine rotation speed NE and the ABV open request time Tmax. The map is stored in the controller 10. As shown in FIG. 3, a relationship in which the ABV open request time Tmax becomes smaller the larger the engine rotation speed NE is stored as the map. That is, in the process of step S105, the ABV open request time Tmax is set as a shorter time the higher the engine rotation speed NE. Thereafter, the process proceeds to step S106.

In step S106, the ABV control unit 12 performs an ABV open/close operation process. In the ABV open/close operation process, the ABV 23 (or ABV 33) is open/close operated based on the ABV temporary open flag. After the ABV open/close operation process is performed, the present processing routine is once terminated.

In the present embodiment, determination is made that the valve opening condition has been satisfied when the intake pressure PIM is smaller than the low-pressure determination value PIML (S103: YES).

Next, the processing routine of the acceleration determining process performed by the acceleration determination unit 11 will be described with reference to FIG. 4. In the present process, the start of execution is instructed by the ABV control unit 12 in step S101 of the open determining process as described above.

When the execution of the present processing routine starts, first, whether or not the request torque TQ(n) is greater than or equal to the acceleration determination value TQH is determined by the acceleration determination unit 11 in step S201. For the request torque TQ(n), the value of the request torque TQ at the time point of the start of execution of the present process is read. The acceleration determination value TQH is set as a threshold value for detecting the acceleration request on the internal combustion engine 20. On the basis of a maximum value the request torque TQ may take, the acceleration determination value TQH is calculated by the acceleration determination unit 11 as a value smaller than the maximum value. The acceleration request is detected when the request torque TQ(n) is greater than or equal to the acceleration determination value TQH.

When the request torque TQ(n) is greater than or equal to the acceleration determination value TQH in step S201 (S201: YES), the process proceeds to step S204. In step S204, the acceleration determination flag is set to ON by the acceleration determination unit 11. Thereafter, the process proceeds to step S205.

In step S205, the acceleration determination unit 11 reads the request torque TQ(n) of when the present process was executed the previous time as a previous request torque TQ(n−1), and determines whether or not the previous request torque TQ(n−1) is smaller than the acceleration determination value TQH. When the previous request torque TQ(n−1) is smaller than the acceleration determination value TQH (S205: YES), the process proceeds to step S207. In step S207, the acceleration initial determination flag is set to ON by the acceleration determination unit 11, and thereafter, the present processing routine is once terminated. When the previous request torque TQ(n−1) is greater than or equal to the acceleration determination value TQH in step S205 (S205: NO), the process proceeds to step S206. In step S206, the acceleration initial determination flag is set to OFF by the acceleration determination unit 11, and thereafter, the present processing routine is once terminated.

In this way, when the request torque TQ(n) is greater than or equal to the acceleration determination value TQH (S201: YES), and the previous request torque TQ(n−1) is smaller than the acceleration determination value TQH (S205: YES), the acceleration initial determination flag is set to ON. That is, the acceleration initial determination flag is set to ON only in the acceleration determining process executed in the next cycle when the request torque TQ reached the acceleration determination value TQH or when the request torque TQ exceeded the acceleration determination value TQH. In other words, the acceleration initial determination flag is set to ON when the request torque TQ becomes greater than or equal to the acceleration determination value TQH from a state the request torque TQ is smaller than the acceleration determination value TQH. By this way, the initial stage at which the acceleration request is made is captured, and the acceleration initial determination flag is set to ON.

When the request torque TQ(n) is smaller than the acceleration determination value TQH in the process of step S201 (S201: NO), the process proceeds to step S202. In step S202, whether or not the request torque TQ(n) is smaller than a determination cancel value TQL is determined. When the request torque TQ(n) is smaller than the determination cancel value TQL (S202: YES), the process proceeds to step S203. In step S203, the acceleration determination flag is set to OFF by the acceleration determination unit 11. Furthermore, the acceleration initial determination flag is set to OFF by the acceleration determination unit 11, and the present processing routine is once terminated. The determination cancel value TQL is calculated by the acceleration determination unit 11 based on the maximum value the request torque TQ may take, and is set as a value smaller than the acceleration determination value TQH.

When the request torque TQ(n) is greater than or equal to the determination cancel value TQL (S202: NO), the present processing routine is once terminated. That is, the acceleration determination unit 11 maintains the set values of the acceleration determination flag and the acceleration initial determination flag, and terminates the present processing routine.

Next, the ABV open/close operation process will be described with reference to FIG. 5. The present process is executed during the open determining process and the close determining process by the ABV control unit 12.

When the execution of the present processing routine starts, first, whether or not the ABV temporary open flag is set to ON is determined in step S301.

When the ABV temporary open flag is set to OFF (S301: NO), the process proceeds to step S302. In step S302, the valve closing operation of the ABV 23 (or ABV 33) is executed. The ABV 23 (or ABV 33) is thereby in the fully closed state, and thereafter, the present processing routine is terminated.

When the ABV temporary open flag is set to ON (S301: YES), the process proceeds to step S303. In step S303, the valve opening operation of the ABV 23 (or ABV 33) is executed. The ABV 23 (or ABV 33) is thereby in the fully opened state, and thereafter, the present processing routine is terminated.

Next, the close determining process in the temporary open/close control will now be described with reference to FIG. 6. The present process is repeatedly executed by the ABV control unit 12 while the ABV temporary open flag is set to ON.

When the execution of the present processing routine starts, first, the ABV control unit 12 increases a value of a counter CT by a constant amount in step S401. The initial value of the counter CT is "0." After the value of the counter CT is increased by a constant amount, the process proceeds to step S402.

In step S402, whether or not the value of the counter CT is greater than or equal to the ABV open request time Tmax is determined by the ABV control unit 12.

When the value of the counter CT is smaller than the ABV open request time Tmax (S402: NO), the process proceeds to step S403. When the value of the counter CT is greater than or equal to the ABV open request time Tmax (S402: YES), the process proceeds to step S404.

In step S403, whether or not the intake pressure PIM is greater than a high-pressure determination value PIMH is determined by the ABV control unit 12. The high-pressure determination value PIMH is obtained through experiments and the like as a value the increase in the supercharging pressure can be expected by the drive of the first and second turbochargers 40, 50 when the intake pressure PIM is greater than the high-pressure determination value PIMH, and stored in advance in the controller 10. When the intake pressure PIM is greater than the high-pressure determination value PIMH (S403: YES), the process proceeds to step S404. When the intake pressure PIM is smaller than or equal to the high-pressure determination value PIMH (S403: NO), the present processing routine is once terminated.

In step S404, the ABV temporary open flag is set to OFF by the ABV control unit 12. Thereafter, the process proceeds to step S405.

In step S405, the value of the counter CT is reset to the initial value of "0." Thereafter, the process proceeds to step S406.

In step S406, the ABV control unit 12 performs the ABV open/close operation process. After the ABV open/close operation process is performed, the present processing routine is once terminated.

In the present embodiment, determination is made that the valve closing condition has been satisfied when the intake pressure PIM is greater than the high-pressure determination value PIMH (S403: YES).

The operation and advantages of the first embodiment will now be described.

FIGS. 7(a) to 7(h) show one example of a timing chart of when the ABV control unit 12 of the controller 10 executes the temporary open/close control. In FIGS. 7(a) to 7(h), a case in which the temporary open/close control is executed for the ABV 23 is illustratively described. Similar operations can be obtained when the temporary open/close control is executed for the ABV 33. In the present embodiment in which the temporary open/close control is respectively executed for the ABV 23 and the ABV 33, the switch of ON and OFF of the ABV temporary open flag of the ABV 23 and the temporary open flag of the ABV 33 may be carried out at the same timing or may be carried out at different timing.

Figures 7A, 7H:
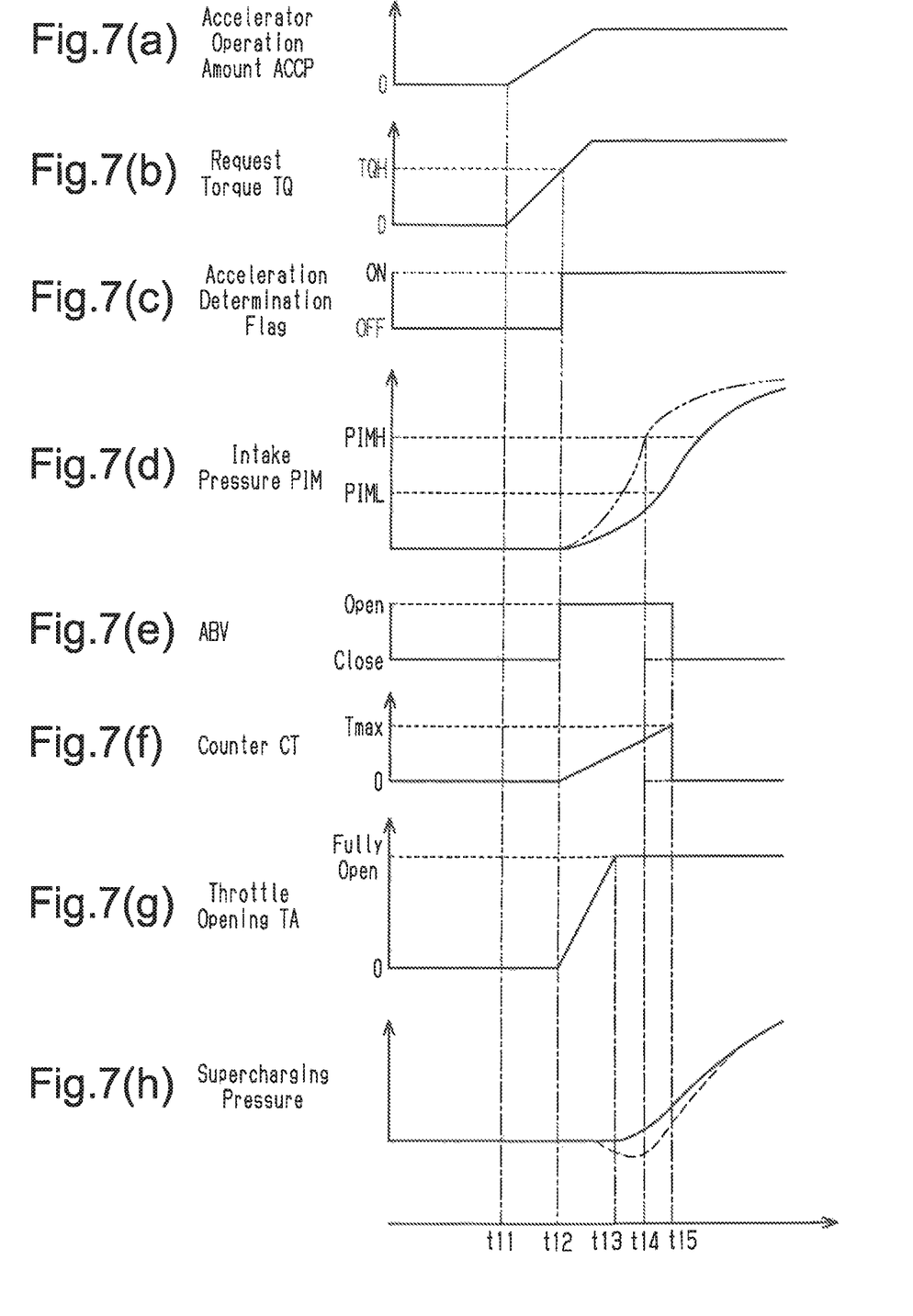

In FIGS. 7(a) to 7(h), the operation of the accelerator pedal 91 starts at timing t11. When the accelerator operation amount ACCP starts to increase accompanying the operation of the accelerator pedal 91 as shown in FIG. 7(a), the value of the request torque calculated by the controller 10 increases as shown in FIG. 7(b) with the increase of the accelerator operation amount ACCP. The request torque TQ reaches the acceleration determination value TQH at timing t12. After the termination of increase in the accelerator operation amount ACCP, the accelerator pedal 91 is operated so that the accelerator operation amount ACCP is maintained at a constant value.

After timing t11, the throttle opening TA is increased as shown in FIG. 7(g) based on the target throttle opening calculated by the controller 10, and the intake pressure PIM is increased as shown in FIG. 7(d). Furthermore, the supercharging pressure at the downstream side of the first compressor 41 is increased as shown in FIG. 7(*h*) with the drive of the first turbocharger 40. In FIG. 7(*h*), the change in the supercharging pressure of when the temporary open/close control of the present embodiment is executed is shown with a solid line, and the change in the supercharging pressure of when the temporary open/close control is not executed is shown with a broken line.

Figure 2:
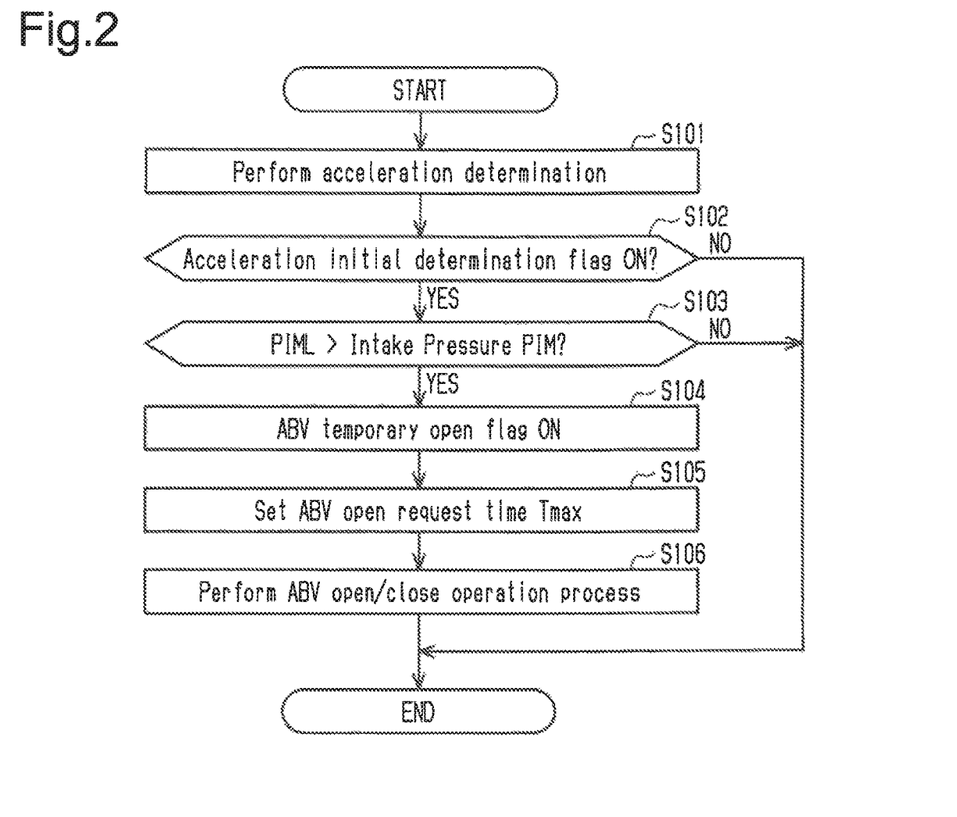
FIG. 2 is a flowchart of an open determining process in a temporary open/close control executed by an ABV control unit of FIG. 1.
Figure 3:
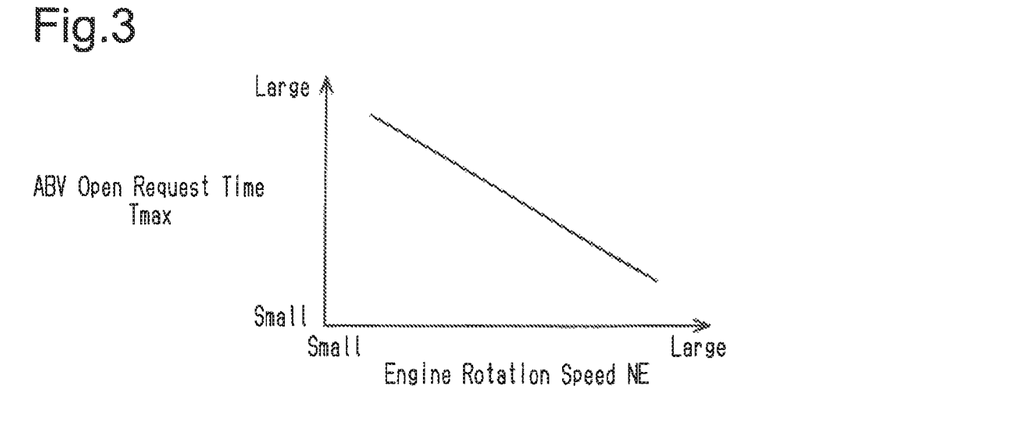
FIG. 3 is a map showing the relationship of an ABV open request time and an engine rotation speed NE set by the ABV control unit of FIG. 1.
Figure 4:
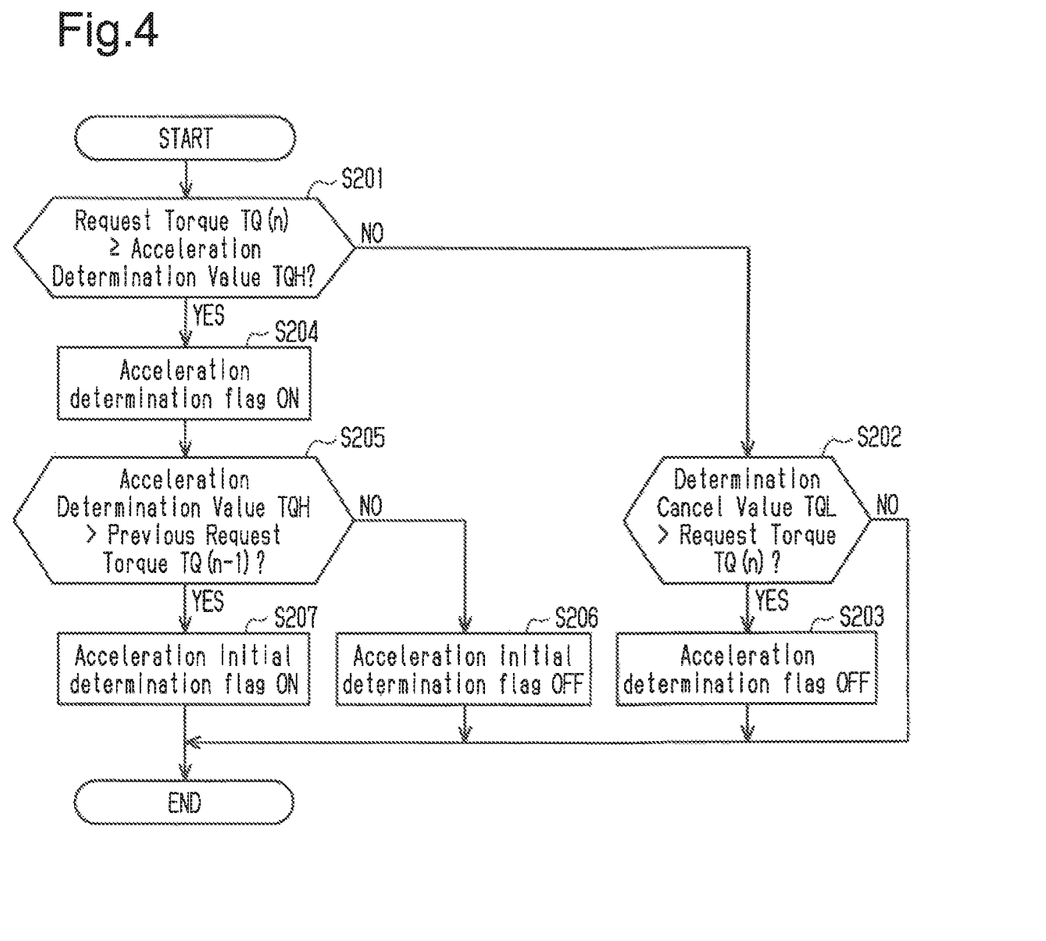
FIG. 4 is a flowchart of an acceleration determining process executed by an acceleration determination unit of FIG. 1.

The ABV control unit 12 causes the acceleration determination unit 11 to start the execution of the acceleration determining process shown in FIG. 4 by the process of step S101 of the open determining process shown in FIG. 2. Before timing t12, the request torque TQ(n) is determined to be smaller than the acceleration determination value TQH (S201: NO), and the acceleration determination flag is set to OFF as shown in FIG. 7(*c*).

When the request torque TQ reaches the acceleration determination value TQH at timing t12, and the request torque TQ(n) is greater than or equal to the acceleration determination value TQH (S201: YES), the acceleration determination flag is set to ON as shown in FIG. 7(*c*) (S204).

The request torque TQ is gradually increased after timing t11, as shown in FIG. 7(*a*). Thus, in step S205 executed following the process of step S204 in which the acceleration determination flag is set to ON, the previous request torque TQ(n−1) is determined to be smaller than the acceleration determination value TQH (S205: YES). The acceleration initial determination flag is set to ON by the acceleration determination unit 11 (S207) at timing t12 by the subsequently executed process.

Similarly, at timing t12, in the open determining process, determination is made that the acceleration initial determination flag is set to ON (S102: YES), and the process of step S103 is executed. Since the intake pressure PIM is smaller than the low-pressure determination value PIML at timing t12, determination is made that the valve opening condition has been satisfied (S103: YES). Thus, the ABV temporary open flag is set to ON (S104).

Figure 5:
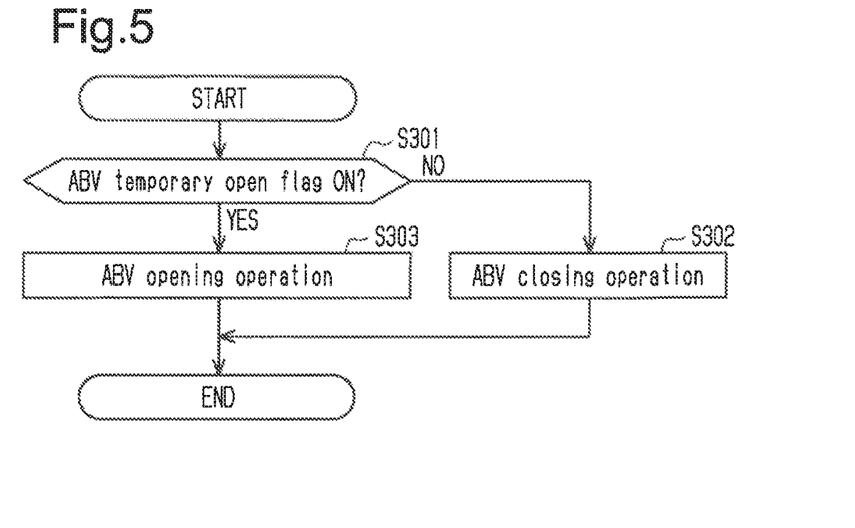
FIG. 5 is a flowchart of an open/close operation process in the temporary open/close control executed by the ABV control unit of FIG. 1.

When the execution of the open/close operation process shown in FIG. 5 starts in step S106 of the open determining process, as the ABV temporary open flag is set to ON (S301: YES), the valve opening operation of the ABV 23 is executed (S303) as shown with a solid line in FIG. 7(*e*).

Figure 6:
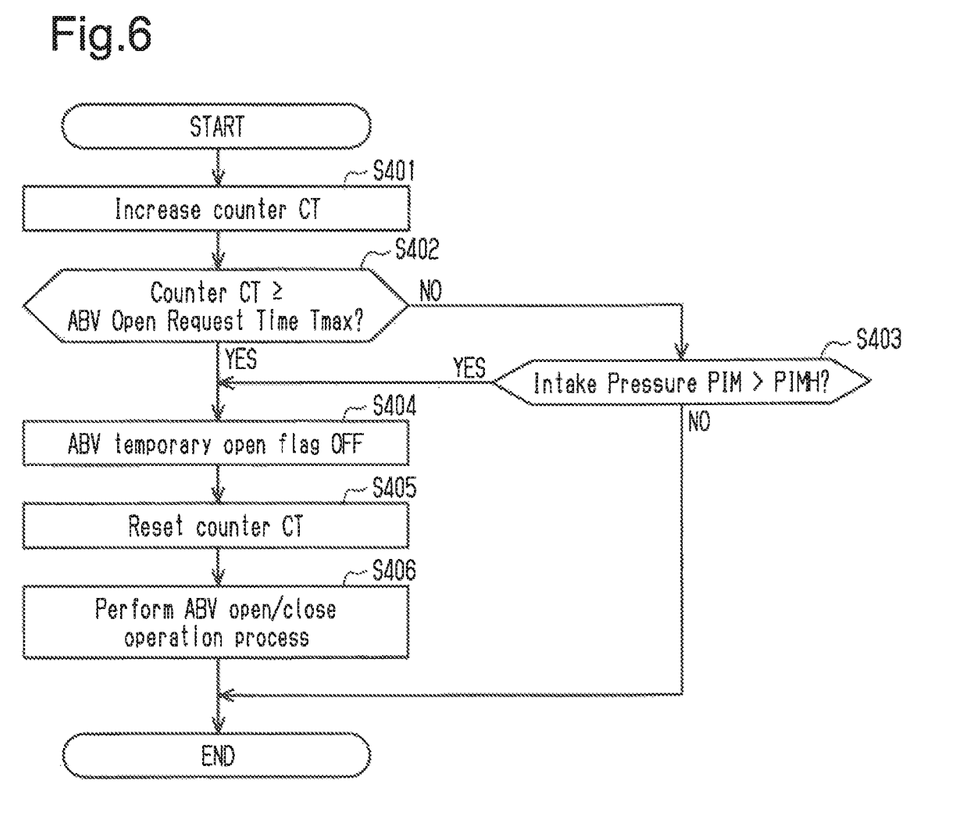
FIG. 6 is a flowchart of a close determining process in the temporary open/close control executed by the ABV control unit of FIG. 1.

Furthermore, as the ABV temporary open flag is set to ON at timing t12, the execution of the close determining process shown in FIG. 6 starts from timing t12. Thus, after timing t12, the value of the counter CT is increased as shown with a solid line in FIG. 7(*f*) (S401).

The value of the counter CT increased after timing t12 reaches the ABV open request time Tmax at timing t15, as shown with a solid line in FIG. 7(*f*). In a period from timing t12 to timing t15, the value of the counter CT is smaller than the ABV open request time Tmax (S402: NO), and the intake pressure PIM is smaller than or equal to the high-pressure determination value PIMH (S403: NO) as shown with a solid line in FIG. 7(*d*). Thus, in the period from timing t12 to timing t15, a state in which the ABV temporary open flag is set to ON is continued.

When the value of the counter CT reaches the ABV open request time Tmax at timing t15 (S402: YES), the ABV temporary open flag is set to OFF (S404). Furthermore, the value of the counter CT is reset (S405) as shown with a solid line in FIG. 7(*f*).

The valve closing operation of the ABV 23 is then executed (S302), as shown with a solid line in FIG. 7(*e*), based on the ABV temporary open flag being set to OFF (S301: NO) by the open/close operation process, which execution starts in step S406.

The timing t12 at which the acceleration initial determination flag is set to ON is the initial stage of the acceleration request. Furthermore, the period from timing t12 to timing t15, at which the value of the counter CT that started to increase after timing t12 reaches the ABV open request time Tmax, is a specified period of temporarily opening the ABV 23 in the temporary open/close control.

When the temporary open/close control is not executed, for example, the supercharging pressure may become lower than the value maintained before the throttle opening TA is controlled to the open side at around timing t13, at which the throttle opening TA is fully opened, as shown with a broken line in FIG. 7(*h*). This is because when the first throttle valve 24 is fully opened in the initial stage of acceleration request, the intake air between the first compressor 41 and the first throttle valve 24 at the downstream side of the first compressor 41 flows into the cylinder with a large pressure loss in the first compressor 41 in the first intake passage 21. Such lowering of the supercharging pressure may cause the supercharging pressure to become lower than or equal to the atmospheric pressure. Similar phenomenon may also occur by the second compressor 51 and the second throttle valve 34 in the second intake passage 31.

Hereinafter, an advantageous effect obtained in the first intake passage 21 including the first compressor 41 of the first turbocharger 40 when the temporary open/close control on the ABV 23 arranged on the first bypass passage 22 is executed will be described. Similar effect is also obtained in the second intake passage 31 including the second compressor 51 of the second turbocharger 50 when the temporary open/close control on the ABV 33 arranged on the second bypass passage 32 is executed.

In the controller 10 in the first embodiment, the ABV 23 is opened by a specified period in the initial stage of the acceleration request. Thus, a portion of the intake air flows through the first bypass passage 22 temporarily bypassing the first compressor 41. The influence by the pressure loss in the first compressor 41 can be reduced by the intake air bypassing the first compressor 41 and flowing toward the downstream side of the first compressor 41 in the initial stage of the acceleration request. Thus, the supercharging pressure can be suppressed from greatly lowering, as shown with a solid line in FIG. 7(*h*).

According to the controller 10, therefore, the lowering of the supercharging pressure can be suppressed by opening the ABV 23 by the temporary open/close control in the initial stage of the acceleration request at when the supercharging pressure sometimes lowers. The response delay of the acceleration thus can be reduced.

Furthermore, when the first throttle valve 24 is fully opened in the initial stage of the acceleration request, the supercharging pressure tends to easily lower the smaller the volume between the first compressor 41 and the first throttle valve 24 in the first intake passage 21. According to the controller 10, the intake air can be introduced to a space between the first compressor 41 and the first throttle valve 24 through the first bypass passage 22 by carrying out valve opening of the ABV 23 by the temporary open/close control. Therefore, in the internal combustion engine 20 to be controlled, it is particularly effective to temporarily open the ABV 23 by the temporary open/close control the smaller the volume between the first compressor 41 and the first throttle valve 24 in the first intake passage 21.

When the ABV 23 is opened, a portion of the intake air is passed through the first bypass passage 22, and thus the increase of the supercharging pressure involved in the increase in the rotation of the turbine wheel easily becomes gradual. Thus, the opening of the ABV 23 by the temporary open/close control is desirably a short period.

With regards to this, in the controller 10 of the first embodiment, when the request torque TQ becomes greater than or equal to the acceleration determination value TQH from the state in which the request torque TQ is smaller than the acceleration determination value TQH, that is, when the initial stage of the acceleration request is captured, and the opening of the ABV 23 can start by the process of step S102 in the open determining process. Thus, the ABV 23 can be temporarily opened only in the initial stage of the acceleration request at when the increase of the supercharging pressure tends to be easily suppressed.

When the first throttle valve 24 is fully opened at the beginning of the acceleration, the supercharging pressure tends to easily lower when the throttle valve is controlled toward the open side if the intake pressure PIM is at a low level. According to the controller 10 of the first embodiment, whether or not the intake pressure PIM is smaller than the low-pressure determination value PIML when the acceleration initial determination flag is set to ON is determined, and determination is made that the valve opening condition has been satisfied when the intake pressure PIM is smaller than the low-pressure determination value PIML. When the valve opening condition has been satisfied, the ABV valve opening operation is executed. Thus, the ABV 23 can be temporarily opened when the supercharging pressure tends to easily lower.

The period in which the supercharging pressure lowers in the initial stage of the acceleration request can be predicted based on the engine rotation speed NE. In the controller 10 of the first embodiment, when carrying out the valve opening operation on the ABV 23 in the temporary open/close control, the ABV open request time Tmax is set as a shorter time the higher the engine rotation speed NE using the map shown in FIG. 3. That is, the time to open the ABV 23 can be changed according to the time predicted that the supercharging pressure will lower. Thus, the time for opening the ABV 23 can be suppressed from becoming excessively long, and the supercharging pressure can be rapidly increased.

In FIGS. 7(a) to 7(h), as shown with a chain double dashed line in FIG. 7(d), when the intake pressure PIM is changed, the intake pressure PIM reaches the high-pressure determination value PIMH at timing t14 before timing t15 at when the value of the counter CT reaches the ABV open request time Tmax. The determination is made that the valve closing condition has been satisfied when the intake pressure PIM becomes greater than the high-pressure determination value PIMH (S403: YES). Thus, at the time point timing t14 has elapsed, the ABV temporary open flag is set to OFF (S404), and the counter CT is reset (S405), as shown with a chain double dashed line in FIG. 7(f). The ABV 23 is valve closing operated (S302), as shown with a chain double dashed line in FIG. 7(e), based on the ABV temporary open flag being set to OFF (S301: NO).

In this case, the time from timing t12 to timing t14 at when the intake pressure PIM reaches the high-pressure determination value PIMH is a specified period of temporarily opening the ABV 23 in the temporary open/close control.

When the intake pressure PIM is at a high level, determination can be made that the lowering of the supercharging pressure that occurs in the initial stage of the acceleration request is resolved. According to the controller 10 of the first embodiment, the ABV 23 is closed when the intake pressure PIM becomes higher than the high-pressure determination value PIMH, so that in the operation state in which the lowering of the supercharging pressure that occurs in the initial stage of the acceleration request is resolved, the temporary open/close control can be terminated and the supercharging pressure can be rapidly increased.

Second Embodiment

A second embodiment of the internal combustion engine controller will now be described.

Figure 8:
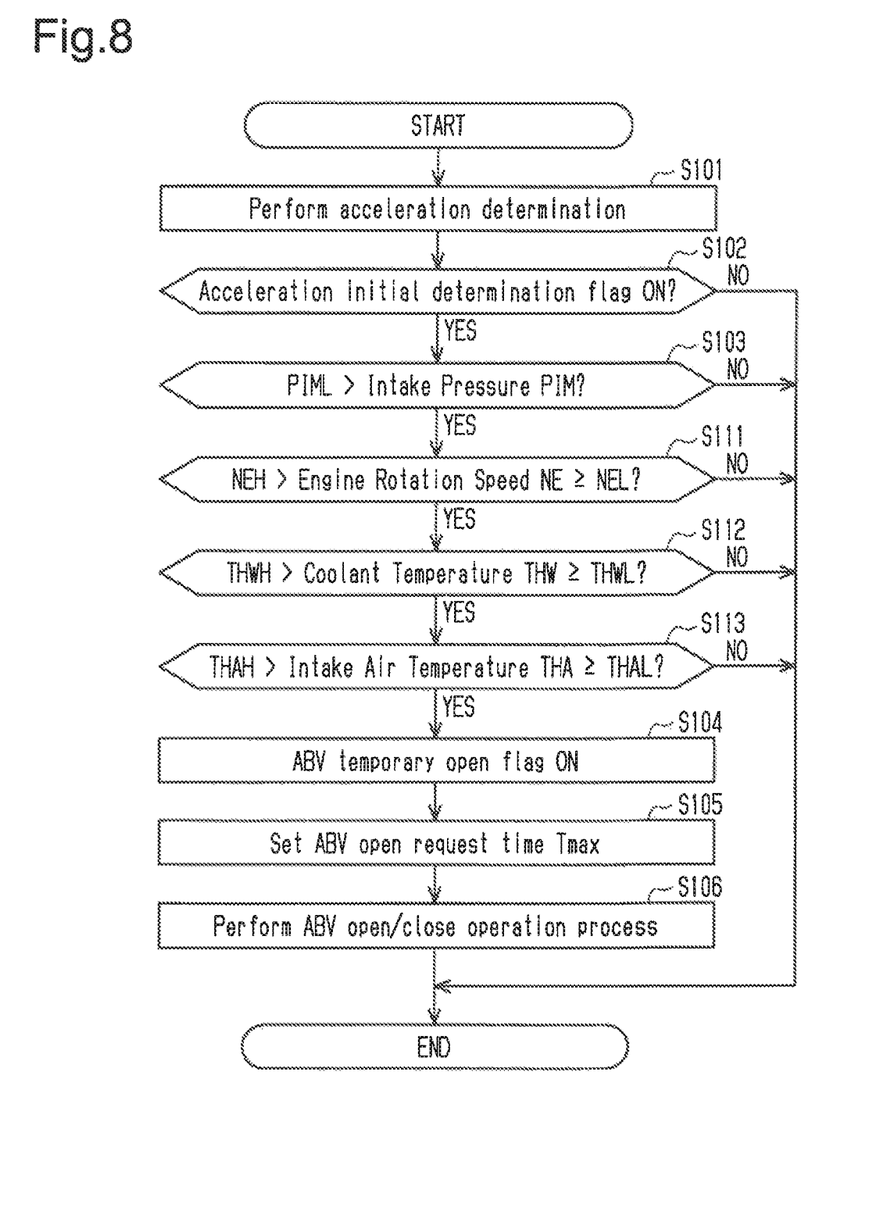
FIG. 8 is a flowchart of the open determining process executed by a controller of a second embodiment.

In the controller of the second embodiment, a processing routine of the open determining process shown in FIG. 8 is executed in place of the processing routine of the open determining process described with reference to FIG. 2 in the first embodiment. Other configurations are similar to the first embodiment, and thus the description thereof will be omitted.

When the execution of the processing routine shown in FIG. 8 starts, the process of step S101 is first executed. In the present processing routine, the processes similar to the processing routine described with reference to FIG. 2 are executed in step S101 to step S103, and thus the description thereof will be omitted. When the intake pressure PIM is greater than or equal to the low-pressure determination value PIML in step S103 (S103: NO), the present processing routine is once terminated. When the intake pressure PIM is smaller than the low-pressure determination value PIML (S103: YES), the process proceeds to step S111.

In step S111, whether or not the engine rotation speed NE is smaller than an upper limit rotation speed NEH and the engine rotation speed NE is greater than or equal to a lower limit rotation speed NEL is determined. That is, whether or not the engine rotation speed NE is within a predetermined range is determined. The upper limit rotation speed NEH is set as a value such that when the engine rotation speed NE is greater than or equal to the upper limit rotation speed NEH, noise and vibration may be generated by the change in airflow when the ABV 23, 33 is temporarily opened. Furthermore, the lower limit rotation speed NEL is set as a value such that when the engine rotation speed NE is smaller than the lower limit rotation speed NEL, the lowering of the supercharging pressure is less likely to occur.

When the engine rotation speed NE is not within the predetermined range in step S111 (S111: NO), the present processing routine is once terminated. When the engine rotation speed NE is within the predetermined range (S111: YES), the process proceeds to step S112.

In step S112, whether or not a coolant temperature THW is lower than an upper limit coolant temperature THWH and the coolant temperature THW is higher than or equal to a lower limit coolant temperature THWL is determined. That is, whether or not the coolant temperature THW is within a predetermined range is determined. When the coolant temperature THW is not within the predetermined range in step S112 (S112: NO), the present processing routine is once terminated. When the coolant temperature THW is within the predetermined range (S112: YES), the process proceeds to step S113.

In step S113, whether or not an intake air temperature THA is lower than an upper limit intake air temperature THAH and the intake air temperature THA is higher than or equal to a lower limit intake air temperature THAL is determined. That is, whether or not the intake air temperature THA is within a predetermined range is determined. When the intake air temperature THA is not within the predetermined range in step S113 (S113: NO), the present processing routine is once terminated. When the intake air temperature THA is within the predetermined range (S113: YES), the process proceeds to step S104.

The upper limit coolant temperature THWH is set as a value such that when the coolant temperature THW is higher than or equal to the upper limit coolant temperature THWH, the response speed of the ABV 23, 33 lowers. Similarly, the upper limit intake air temperature THAH is set as a value such that when the intake air temperature THA is higher than or equal to the upper limit intake air temperature THAH, the response speed of the ABV 23, 33 lowers.

The lower limit coolant temperature THWL is set as a value such that when the coolant temperature THW is lower than the lower limit coolant temperature THWL, the precision of the air model used in the air fuel ratio control lowers. Similarly, the lower limit intake air temperature THAL is set to a value such that when the intake air temperature THA is lower than the lower limit intake air temperature THAL, the precision of the air model lowers.

The processes executed after step S104 are similar to the processing routine described with reference to FIG. 2.

That is, the intake pressure PIM being smaller than the low-pressure determination value PIML has been adopted for the valve opening condition in the first embodiment, but in the processing routine shown in FIG. 8 executed by the ABV control unit of the controller in the second embodiment, the valve opening condition is added to the processing routine of the open determining process in the first embodiment. Here, the valve opening condition determined to be satisfied when the intake pressure PIM is smaller than the low-pressure determination value PIML (S103: YES) is assumed as a first valve opening condition. In the second embodiment, determination is made that a second valve opening condition has been satisfied when the engine rotation speed NE is within the predetermined range (S111: YES). Furthermore, determination is made that a third valve opening condition has been satisfied when the coolant temperature THW is within the predetermined range (S112: YES). Moreover, determination is made that a fourth valve opening condition has been satisfied when the intake air temperature THA is within the predetermined range (S113: YES). In the second embodiment, the ABV temporary open flag is set to ON when all of the first to fourth valve opening conditions are satisfied.

The operations and effects of the second embodiment will be described. A case in which the temporary open/close control for the ABV 23 is executed will be described, but similar operation effects will also be obtained for the ABV 33, similar to the first embodiment.

When the engine rotation speed NE is at a low level, the period in which the supercharging pressure lowers in the initial stage of acceleration request is short and the lowering amount of the supercharging pressure is also small. That is, the effect that can be obtained is small even if the ABV 23 is temporarily opened. Furthermore, the influence on the supercharging pressure is sometimes greater when the supercharging is delayed by the temporary opening of the ABV 23. According to the second embodiment, the ABV 23 can be temporarily opened when the effect obtained by temporarily opening the ABV 23 is large by determining that the second valve opening condition has been satisfied when the engine rotation speed NE is greater than or equal to the lower limit rotation speed NEL.

Furthermore, when the engine rotation speed NE is at a high level, noise and vibration may be generated by temporarily opening the ABV 23. According to the second embodiment, the noise and vibration can be suppressed from being generated when opening the ABV 23 by the temporary open/close control by determining that the second valve opening condition has been satisfied when the engine rotation speed NE is smaller than the upper limit rotation speed NEH.

When the coolant temperature THW is at a high level, the response speed of when opening/closing the ABV 23 is lowered and the switch between valve opening and valve closing may not be executed in a short time. According to the second embodiment, the ABV 23 can be suppressed from being temporarily opened when the response speed of the ABV 23 is lowering by determining that the third valve opening condition has been satisfied when the coolant temperature THW is lower than the upper limit coolant temperature THWH.

When the coolant temperature THW is at a low level, the precision of the air model used in the air fuel ratio control may lower, and the air fuel ratio may vary by the change in the operation state caused by temporarily opening the ABV 23. According to the second embodiment, the air fuel ratio can be suppressed from varying when opening the ABV 23 by the temporary open/close control by determining that the third valve opening condition has been satisfied when the coolant temperature THW is higher than or equal to the lower limit coolant temperature THWL.

Furthermore, according to the second embodiment, determination is made that the fourth valve opening condition has been satisfied when the intake air temperature THA is lower than the upper limit intake air temperature THAH and the intake air temperature THA is higher than or equal to the lower limit intake air temperature THAL. Thus, the ABV 23 can be suppressed from being temporarily opened when the response speed of the ABV 23 is lowering. Furthermore, the air fuel ratio can be suppressed from varying when opening the ABV 23 by the temporary open/close control.

It should be apparent to those skilled in the art that the present invention may be embodied in many other specific forms without departing from the spirit or scope of the invention. Particularly, it should be understood that the present invention may be embodied in the following forms.

In the second embodiment, the ABV temporary open flag is set to ON when all of the first to fourth valve opening conditions are satisfied. A configuration in which the ABV temporary open flag is set to ON when one of the valve-opening conditions of the first to fourth valve opening conditions has been satisfied may be adopted.

In the processing routine of the open determining process executed in the second embodiment, one or more processes of the processes of step S103, step S111, step S112, and step S113 may be omitted.

The valve opening condition for determining the propriety of meeting the condition in the open determining process of the second embodiment may further include other conditions.

For example, abnormality not occurring in the intake pressure sensor 83 may be added to the valve opening condition. When abnormality is found in the intake pressure sensor 83, the intake pressure PIM cannot be accurately calculated, and the opening/closing of the ABV 23, 33 may be unintentionally carried out. According to the configuration described above, the valve opening operation of the ABV 23, 33 can be suppressed from being executed in the temporary open/close control when abnormality is occurring in the intake pressure sensor 83.

The voltage of the driving mechanism of the ABV 23, 33 being stable may be added to the valve opening condition. For example, when the voltage is low, the response speed of the ABV 23, 33 is limited, and the open/close operation of the ABV 23, 33 may not be executed in a short time. According to the configuration described above, the valve opening operation of the ABV can be suppressed from being executed in the temporary open/close control when the response speed of the ABV 23, 33 may lower.

In the first and second embodiments, the ABV open request time Tmax is set as a shorter time the higher the engine rotation speed NE. In the setting of the ABV open request time Tmax, the ABV open request time Tmax may be set as a shorter time when the intake pressure PIM is high than when low.

In the calculation of the ABV open request time Tmax, the correction coefficient may be multiplied to the basic ABV open request time that is calculated to be short when the engine rotation speed NE is high than when low to calculate the ABV open request time Tmax. A value that makes the ABV open request time Tmax short when the intake pressure PIM is high than when low can be adopted for the correction coefficient.

In the first and second embodiments, the ABV 23, 33 may be closed when the intake pressure PIM becomes higher than the high-pressure determination value PIMH and the valve closing condition has been satisfied regardless of the relationship between the ABV open request time Tmax and the counter CT.

The valve opening operation of the ABV 23, 33 executed in the ABV open/close operation process of the first and second embodiments is not limited to the operation of fully opening the ABV 23, 33. The opening of the ABV 23, 33 controlled by the controller may not be fully open, and the opening can be adjusted between the fully closed state and the fully opened state.

In the acceleration determination of the first and second embodiments, the presence/absence of the acceleration request is detected based on the request torque TQ, and the acceleration determination flag and the acceleration initial determination flag are set. For the acceleration determination, for example, the presence/absence of the acceleration request may be detected based on the throttle opening TA, or the presence/absence of the acceleration request may be detected based on the intake air amount.

In the first and second embodiments, the temporary open/close control is executed for the ABV 23, 33, respectively. A common temporary open/close control may be executed on both ABVs 23, 33 to control both ABVs 23, 33.

In the first and second embodiments, the intake pressure PIM is calculated based on the detection signal from the intake pressure sensor 83. The intake pressure PIM can also be estimated using, for example, the air model. Similarly, the supercharging pressure at the downstream side of the first and second compressors 41, 51 may be estimated.

In the first and second embodiments, the internal combustion engine 20 in which two turbochargers, the first turbocharger 40 and the second turbocharger 50, are arranged in parallel is a control target. The controller in each embodiment described above can also be applied to an internal combustion engine including one turbocharger. Furthermore, the controller can also be applied to an internal combustion engine in which a plurality of turbochargers are arranged in series.

The internal combustion engine serving as the control target is not limited to the six-cylinder internal combustion engine.

The controller 10 may include a central processing unit and a memory, and is not limited to processing all the various types of processes described above by software. For example, the controller 10 may include dedicated hardware (Application Specific Integrated Circuit: ASIC) that executes at least some processes. That is, the controller 10 may be a circuit including 1) one or more dedicated hardware circuits such as ASIC, 2) one or more processors (microcomputers) that operates according to a computer program (software), or 3) combination thereof.

The present examples and embodiments are to be considered as illustrative and not restrictive, and the invention is not to be limited to the details given herein, but may be modified within the scope and equivalence of the appended claims.

The invention claimed is:

1. An internal combustion engine having a turbocharger, the internal combustion engine comprising:
   an intake passage;
   a compressor arranged in the intake passage;
   a bypass passage connecting a portion of the intake passage at an upstream side of the compressor and a portion of the intake passage at a downstream side of the compressor;
   an air bypass valve adjusting a flowrate of intake air passing through the bypass passage; and
   an internal combustion engine controller including a non-transitory processor programmed with executable instructions to:
   detect an acceleration request generated by an accelerator pedal and sent to the internal combustion engine, and determine whether or not the acceleration request is in an initial stage; and
   execute a temporary open/close control to open the air bypass valve for a predetermined time period when the internal combustion engine controller has determined the acceleration request to be in the initial stage, wherein
   the acceleration request is determined to be in the initial stage by the internal combustion engine controller when a requested torque of the internal combustion engine becomes greater than or equal to an acceleration determination value after being in a state in which the requested torque was smaller than the acceleration determination value.

2. The internal combustion engine according to claim 1, wherein the executable instructions further instruct the processor to
   open the air bypass valve during the temporary open/close control when the internal combustion engine controller has determined that an intake pressure, which is an inner pressure of an intake manifold of the internal combustion engine, is lower than a low pressure determination value.

3. The internal combustion engine according to claim 1, wherein the executable instructions further instruct the processor to
   open the air bypass valve during the temporary open/close control when the internal combustion engine controller has determined that an engine rotation speed of the internal combustion engine is greater than or equal to a lower limit rotation speed.

4. The internal combustion engine according to claim 1, wherein the executable instructions further instruct the processor to
   open the air bypass valve during the temporary open/close control when the internal combustion engine controller has determined that a coolant temperature of the internal combustion engine is lower than an upper limit coolant temperature.

5. The internal combustion engine according to claim 1, wherein the executable instructions further instruct the processor to set a duration of the predetermined time period, when starting to open the air bypass valve during the temporary open/close control, so that the duration of the predetermined time period is shorter while an engine rotation speed of the internal combustion engine is determined by the internal combustion engine controller to be higher at a time point when the opening of the air bypass valve starts; and close the air bypass valve if an elapsed time from when the air bypass valve is opened reaches an end of the predetermined time period during the execution of the temporary open/close control.

6. The internal combustion engine according to claim 5, wherein the executable instructions further instruct the processor to close the air bypass valve during the temporary open/close control when an intake pressure, which is an inner pressure of an intake manifold of the internal combustion engine, is determined by the internal combustion engine controller to be higher than a high pressure determination value.

* * * * *